(No Model.)

J. L. KEEL.
HARROW.

No. 577,431. Patented Feb. 23, 1897.

Witnesses
Thos. H. Speidel
A. R. Brown

Inventor
James L. Keel
By Chas J. Gooch
his Attorney

UNITED STATES PATENT OFFICE.

JAMES L. KEEL, OF TALKING ROCK, GEORGIA, ASSIGNOR OF ONE-HALF TO ROBERT A. RAY, OF SAME PLACE.

HARROW.

SPECIFICATION forming part of Letters Patent No. 577,431, dated February 23, 1897.

Application filed July 18, 1896. Serial No. 599,709. (No model.)

*To all whom it may concern:*

Be it known that I, JAMES L. KEEL, a citizen of the United States, residing at Talking Rock, in the county of Pickens and State of Georgia, have invented certain new and useful Improvements in Harrows; and I do hereby declare the following to be a full, clear, and exact description of the invention, such as will enable others skilled in the art to which it appertains to make and use the same.

This invention relates to improvements, as hereinafter set forth, in harrows.

Figure 1:
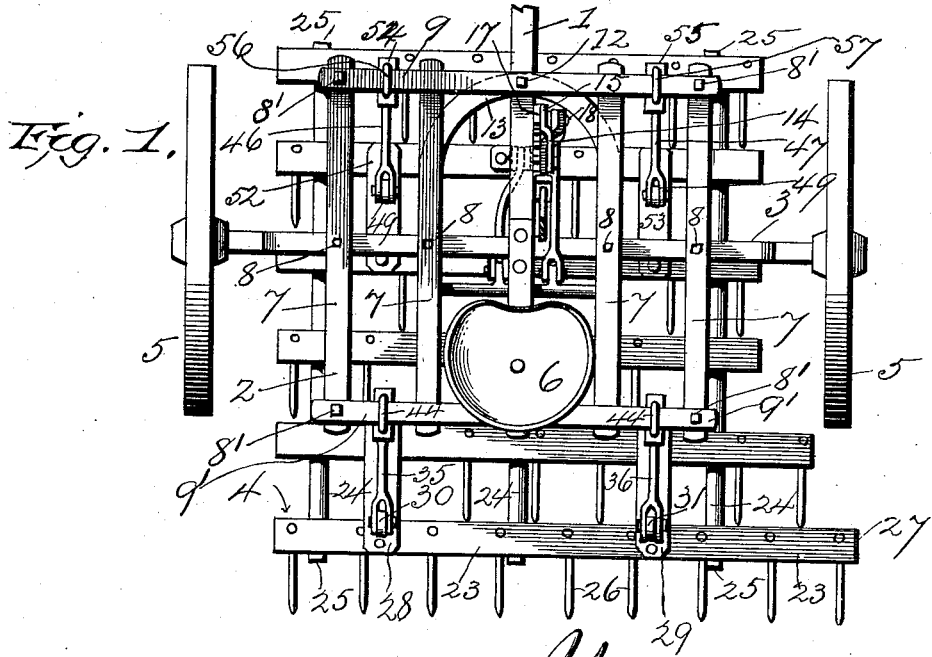
Figure 2:
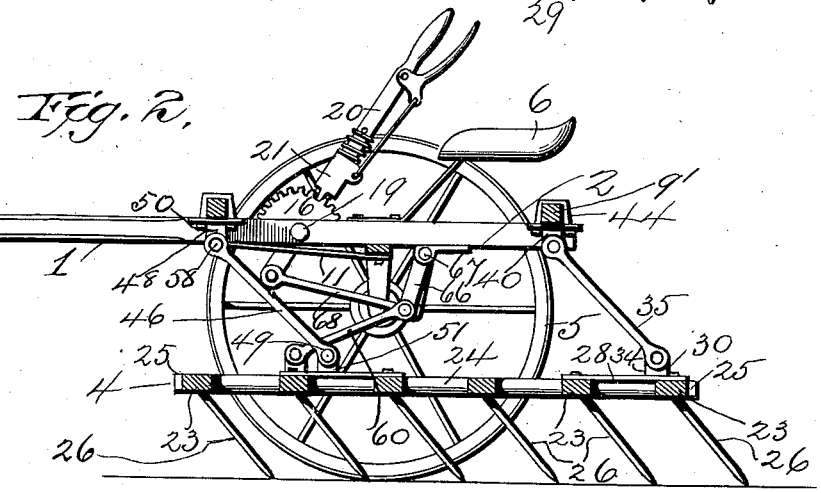
Figure 3:
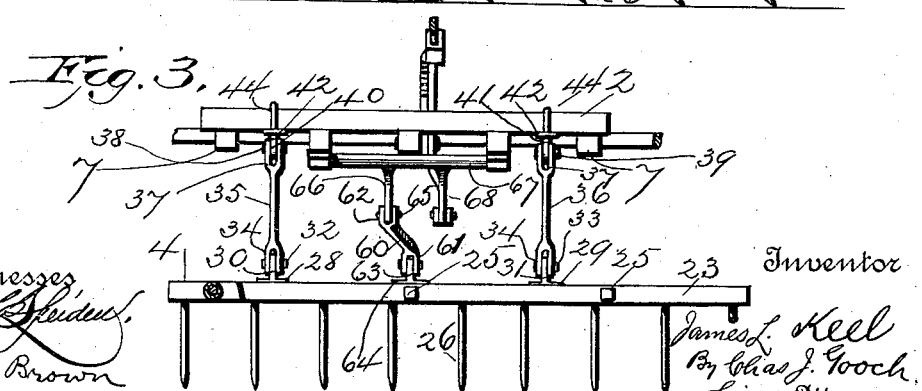

In the drawings, Figure 1 represents a top plan view; Fig. 2, a section on the line 2 2 of Fig. 1; and Fig 3 a rear elevation, partly broken away, of a harrow constructed according to my invention.

The object of my invention is to produce a combined cultivating and smoothing harrow composed of a main frame supported on a preferably crooked axle, a tooth-carrying frame consisting of a series of connected tooth-bars suspended from said main or upper frame on a series of links or levers having end bearing, respectively, on said frames, the rear tooth-bars extending laterally across the wheel-tracks, and lever mechanism for raising and lowering and longitudinally reciprocating the connected tooth-bars.

1 represents the draft, which in the drawings is shown as in the form of a pole or tongue extending rearwardly to the rear of the upper or main frame, though any other form of draft appliance may be employed, as desired.

2 represents the main upper frame with which the axle and drive-wheels are connected and on which the driver's seat 6 is supported.

3 represents the axle, which it is preferred shall be flat and of the crooked form to maintain the frame 2 in a sufficiently-raised position to admit of the vertical and rocking movements in adjustment thereunder of the connected tooth-bars or harrow-frame 4.

5 represents the traction-wheels, and 6 the driver's seat.

The main or upper frame 2 is composed of a series of longitudinal bars 7, bolted, as at 8, or similarly secured to the flat axle 3, and front cross-bar 9 and rear cross-bar 9', superposed on and bolted, as at 8', to the longitudinal bars 7 and to the draft-pole or tongue 1.

11 represents a series of bowed struts or braces bolted at their ends to the under faces of the longitudinal bars 7 and at their centers to the under faces of the axle, across which they extend, so as to afford firm support on said axle to said upper or main frame 2.

13 represents a U-shaped plate bolted at its inner ends to the under face of the axle and at the center of its front portion bolted, as at 12, to the draft-pole and front cross-bar, so as to connect and brace said frame, axle, and draft-pole together.

14 represents a keeper having flanged ends 15, and 16 represents a toothed segment having flanged ends 17 and interposed between said keeper and the adjacent side of the draft-pole. 18 represents bolts passed through the flanged ends 15 17, respectively, of said keeper and toothed segment, and also through said draft-pole, to removably connect the same, and 19 represents another bolt extending through the center of said keeper, the segment, and the draft-pole, respectively.

20 represents the lever, by means of which the lower harrow-frame is, as will presently appear, raised and lowered according to requirement. This lever has rocking bearing on the center bolt 19 and is provided with a spring dog or pawl 21 to engage the toothed segment and hold the harrow-frame in adjusted position.

4 represents the harrow-frame proper. This is composed of a series of transverse tooth-bars 23, connected together by end and central rods or bolts 24, passing through said tooth-bars, the ends of said rods or bolts 24 being threaded and clamped in position by nuts 25. 26 represents the harrow-teeth. The tooth-bars rearwardly of the traction-wheels 5 are of greater length than are the remaining tooth-bars, so as to extend laterally thereof across the path of either or both of the drive or traction wheels 5 for the purpose of harrowing the track of the traction-wheels. In the drawings the lateral extension of said rear tooth-bars is shown, as at 27, as extending across the path of one traction-wheel only, but it is manifest that said bars can be extended so as to cover the path of both of said wheels when desired, and I reserve the right to so extend them.

I will now proceed to describe the means by which the harrow-frame 4 and tooth-bars and the upper frame 2, mounted on the axle, are connected and the harrow or tooth-bar frame is vertically reciprocated to either adjust the same to different degrees of penetration or to raise the same entirely from contact with the ground, as desired.

28 29 represent a pair of straps mounted on and each connected with and extending across a pair of the rear tooth-bars, adjacent to or near their respective ends. From each of these straps extends vertically upward a short standard or ear 30 31, respectively. These standards or ears each have at its upper portion a transverse bore, through which is passed a bolt 32 or 33, affording pivotal bearing to the forked or bifurcated lower ends 34 of a pair of link-levers 35 36, whose upper ends are similarly forked or bifurcated, as at 37, and have pivotal bearing on bolts 38 39, passed through slotted ears 40 41, depending from a pair of straps 42 42, secured to the under side of the rear cross-bar of the upper frame 2, adjacent to the ends thereof, by U-shaped staples 44, straddling the rear cross-bar 9'. The front portion of the respective frames are similarly connected by a pair of end lever-links 46 47, having bifurcated upper ends 48 and bifurcated lower ends 49, straddling the upper and the lower ears 50 51, respectively, extending vertically from straps 52 53, connected to and extending transversely across a pair of the forward tooth-bars, and similar straps 54 55, secured to the under face of the front cross-bar 9, the straps 54 55 being secured in position by U-shaped staples 56 57, straddling said cross-bar 9, bolts 58, passed through said ears 50 51, serving as pivotal bearings for the upper and lower ends, respectively, of the front frame connecting and supporting link-levers 46 47.

60 represents an angularly-shaped link-lever for connecting the two frames 2 and 4 and supporting the harrow-frame at the center of the front thereof. This link-lever 60 also has bifurcated ends 61 62, its lower end having pivotal bearing in an ear 63, extending vertically upward from a strap 64 on the frame 4, its upper end having bolt connection 65 with an ear 66, depending from a rock-shaft 67, having oscillatable end bearing in ears depending from the upper frame 2.

68 represents a link or lever having connection at its front end with the lower end of the harrow-frame-operating lever 20 and at its rear end with an ear depending from the rock-shaft 67, so that as said lever 20 is drawn rearwardly it will, through the medium of the link-lever 68, oscillate the rock-shaft 67, and, turning the ears depending therefrom, raise the upper end of the link-lever, connecting one of said ears and the harrow-frame and force the lower end of said link-lever down, thereby forcing down the harrow-frame to the desired degree, according to the amount of soil penetration desired. As this movement downward of the harrow-frame is effected the lower ends of the respective front and rear link-levers connecting the respective frames and on which the harrow-frame is hung are similarly depressed, as will be readily understood.

When it is desired to raise the harrow-frame to either limit, the amount of engagement of the harrow-teeth with the soil, or, as desired, to raise said harrow-frame up adjacent to the upper frame, so as to permit of the machine traveling with the teeth entirely free from contact with the earth, the operative lever 20 is pushed forward, which act rocks the rock-shaft and the ears thereon rearwardly, so as to depress the upper ends of the series of link-levers and raise the lower ends thereof and thus draw up the harrow-frame.

The degree at which the harrow-frame shall be either depressed or raised depends upon the extent to which the operative lever 20 is either pushed forward or drawn rearward, the segment and dog previously described serving to lock said operative lever and the harrow-frame and connections in adjusted position.

By reason of the construction and arrangement of the link-levers shown and described the harrow-frame is securely hung to the main frame, and in connection with the rock-shaft and operative lever and their connections a steady and positive reciprocal vertical movement in either direction can be very readily imparted to the harrow-frame with the minimum expenditure of force, a boy who is able to drive being capable of operating my improved harrow. The formation and arrangement of the front and rear link-levers, as shown, moreover, cause the harrow-frame to oscillate slightly forwardly when lowered and to pass in a rearward direction while being raised, so as to bring the front thereof in alinement with the front cross-bar of the main frame.

Having thus described my invention, what I claim is—

A harrow consisting of traction-wheels, an axle having bent ends, a main frame supported on said axle, a draft-pole, an operative lever journaled on said pole and having a spring-pawl, a toothed segment having bearing on said pole, a rock-shaft having bearing on the under portion of said main frame and having a downwardly-projecting strap or arm, a lever having end pivotal connection, respectively, with the lower end of the operative lever and with the arm projecting downwardly from said rock-shaft, a harrow-frame having rear tooth-bars of greater length than the other tooth-bars and extending laterally across the path of either or both of said traction-wheels link-bearings connected, respectively, with the forward and rear portions of the main and harrow frames, a series of link-levers located at the front and rear of and having pivotal end connection, respectively, on said link-bearings on the main and harrow frames, respectively, and a central link-lever having end connection, respectively, with the harrow-frame and with a strap depending from the said rock-shaft, substantially as and for the purpose set forth.

In testimony whereof I affix my signature in presence of two witnesses.

JAMES L. KEEL.

Witnesses:
R. O. HOPKINS,
A. V. JONES.